United States Patent [19]
Hansen et al.

[11] Patent Number: 5,180,297
[45] Date of Patent: Jan. 19, 1993

[54] FLUID TRANSFER PUMP WITH SHAFT SEAL STRUCTURE

[75] Inventors: Milton N. Hansen; Steven D. McMahon, both of Mansfield, Ohio

[73] Assignee: The Gorman-Rupp Company, Mansfield, Ohio

[21] Appl. No.: 674,501

[22] Filed: Mar. 22, 1991

[51] Int. Cl.⁵ ............................................. F04C 15/00
[52] U.S. Cl. .................................... 418/104; 418/102; 277/81 R; 277/112
[58] Field of Search ............... 418/104, 171, 83, 170, 418/102; 277/81 R, 93 R, 93 SD, 91, 102, 112

[56] References Cited

U.S. PATENT DOCUMENTS

| | | | |
|---|---|---|---|
| 2,306,417 | 12/1942 | Wiessner | 277/93 |
| 2,743,121 | 4/1956 | Stevens | 277/81 |
| 2,801,593 | 8/1957 | Mosbacher | 277/93 |
| 2,930,636 | 3/1960 | Tracy | 277/93 |
| 3,152,551 | 10/1964 | Peters . | |
| 3,374,748 | 3/1968 | Marsh . | |
| 3,876,349 | 4/1975 | Svensson . | |
| 3,887,310 | 6/1975 | Gerber . | |
| 3,907,465 | 9/1975 | Dorff et al. . | |
| 3,972,387 | 8/1976 | Braun . | |
| 4,098,561 | 7/1978 | Tschirky et al. | 418/104 |
| 4,290,611 | 9/1981 | Sedy | 277/81 R |
| 4,294,453 | 10/1981 | Inouye et al. | 277/93 SD |
| 4,361,419 | 11/1982 | Vöhringer | 418/171 |
| 4,669,738 | 6/1987 | Netzel . | |
| 5,052,658 | 10/1991 | Heil | 277/112 |

OTHER PUBLICATIONS

"Engineers Digest", Published Jan., 1990, p. 33.

Primary Examiner—Richard A. Bertsch
Assistant Examiner—David L. Cavanaugh
Attorney, Agent, or Firm—Watts, Hoffmann, Fisher & Heinke Co.

[57] ABSTRACT

An improved sealing apparatus for gear transfer pump of the type that includes a gear driven by a drive shaft connected to a drive source. The drive shaft extends through a backhead which includes a seal system for inhibiting fluid leakage between the drive shaft and the backhead. The seal system includes a tubular insert held at one end by a support element threadedly received in an end bore of the backhead and structure defined by the backhead which engages another portion of the insert and includes a secondary seal for inhibiting fluid leakage between the insert and the backhead. The insert includes structure for mounting at least a portion of the seal in predetermined alignment with the drive shaft. The drive shaft includes an abutment for locating a rotating portion of the seal for applications that include two-part seals. A seal cartridge is disclosed in which non-rotating and rotating portions of the seal form a single assembly that is installed as a unit into the backhead. During installation non-rotating portions of the seal cartridge are locked to the backhead whereas rotating portions of the seal are clamped to the drive shaft. The seal insert forms part of the seal cartridge and is connected to a seal support sleeve by a connecting member to form an assembly that is installed as unit. This sealing system also makes provision for tandem and double seals as well as means for quenching or flushing seals or seal portions.

26 Claims, 8 Drawing Sheets

FLUID TRANSFER PUMP WITH SHAFT SEAL STRUCTURE

TECHNICAL FIELD

The present invention relates generally to fluid pumps and in particular to an improved sealing system for a gear type transfer pump.

BACKGROUND ART

Gear type transfer pumps are used in many applications to pump fluids. The type of transfer pump to which this invention pertains, usually includes a pair of gears, one of which is externally driven and which in turn drives an associated gear. As is well known, the meshing and unmeshing of gear teeth between these gears effects the transfer of fluid from an inlet to an outlet.

An example of this type of fluid pump is a "gear within a gear" transfer pump. In this type of pump, an outer, driven gear (also termed "rotor") drivingly engages a smaller, internal idler gear. A crescent is usually positioned between a portion of the periphery of the idler gear and an internal periphery of the rotor. In this type of pump, the outer gear or rotor is connected to a shaft that extends axially through a housing portion sometimes termed a "backhead" and is attached directly or indirectly to a drive motor.

During operation, fluid leakage between the drive shaft and its associated housing (or backhead) is inhibited by a seal arrangement. With many prior art "gear within a gear" transfer pumps, the backhead is specifically designed to accept a certain type of seal. As an example, many prior art pumps of this type, use a "packing" type seal which includes seal material placed around the drive shaft and maintained in compression by a pressure applying member (usually a ring) that is adjustable externally of the backhead. As the packing wears, the pressure applying ring is adjusted to apply further pressure on the packing.

For applications in which packing is not suitable, the shaft housing or backhead is typically redesigned to accept the type of seal that is required for the particular application. In many if not most of these designs, maintenance and/or replacement of the seal is very difficult and time consuming.

Attempts have been made to make "cartridge seals" which are more easily replaceable. With a cartridge seal, a unitary seal assembly including rotating and non-rotating portions is installed into, or removed from the pump as a single unit. The cartridge includes structure for maintaining alignment of the various seal portions and as a result, in theory, maintenance personnel are not saddled with the task of making precise adjustments in the seal and/or are not required to carefully press fit seal portions onto the shaft or into the housing. However, it has been found that commercially available "cartridge seals" are extremely expensive and again, the shaft housing of the transfer pump must be specifically designed to accept the cartridge seal.

DISCLOSURE OF THE INVENTION

The present invention provides a new and improved transfer pump having at least one externally driven gear and a shaft housing or backhead surrounding an axially extending drive shaft. The housing or backhead includes a sealing system by which a variety of seals can be easily installed in order to inhibit fluid leakage between the drive shaft and the backhead. A wide variety of seals and seal assemblies can be accommodated by the sealing system to suit the particular application that the pump is intended for.

According to the invention, the seal system includes a backhead that defines a seal region surrounding at least a portion of the pump drive shaft. The seal region is adapted to sealingly receive a seal insert which is positionable between an interior surface of the backhead and the drive shaft and which includes seal mounting structure for mounting and retaining a non-rotating seal or a non-rotating portion of a seal assembly that includes both rotating and non-rotating portions. A secondary seal is provided between the seal insert and the backhead to inhibit fluid leakage between the two members. A seal insert positioning member is removably received by structure on the backhead and locates and maintains the position of the seal insert within the seal region. In some applications, the seal locating member is operative to apply axial forces to the seal insert which in turn transfers a biasing force to the shaft seal itself.

According to the preferred and illustrated embodiment, the backhead terminates in an internally threaded bore adapted to receive a removable, seal member support element. Removal of the element from the backhead enables the seal insert and seal portions to be removed from the drive shaft and easily replaced. In addition, during manufacture of the pump, a customer can specify a particular type of seal needed and during assembly, the appropriate seal insert and seal portions are easily mounted into the backhead. This is achieved without the need for special backhead machining or modifications.

According to one embodiment of the invention, the drive shaft includes a seal abutment structure, preferably in the form of a shoulder, against which a rotating portion of the shaft seal, such as a mechanical seal, abuts. For some seal applications, a biasing means may be provided for biasing the rotating portion of the seal into sealing contact with its associated non-rotating portion. A port may be formed in the backhead to provide access to at least portions of the seal.

In another preferred embodiment of the invention, a double seal arrangement is disclosed. In this arrangement, a stationary seat is sealingly held by the seal insert. A second stationary seat is sealingly held by a pump housing insert. A pair of spring biased sealing rings are mounted to and rotate with the drive shaft and are urged into abutting contact with associated stationary seats.

In another embodiment, the seal insert is adapted to provide a tandem seal arrangement. In this embodiment, the seal insert supports a mechanical seal between itself and the rotating shaft at an intermediate location along the drive shaft. A second mechanical seal is mounted at an outboard end of the drive shaft and is surrounded by the seal insert. In this embodiment, the seal insert includes a port through which lubricating fluid from an external source is communicated to the seal region of the outboard seal. The port formed in the insert is preferably aligned with a port formed in the backhead and connection to the seal insert port is made through the backhead port.

Another embodiment of the invention includes a seal seat quench arrangement. In this embodiment, the seal insert mounts a conventional mechanical seal in an intermediate position on the shaft. The seal is mounted between a shoulder formed on the drive shaft and an inner end of the insert; the insert holds a stationary seat forming part of the seal. A port formed in the insert allows quenching fluid to be communicated to the stationary seat. A throttle bushing is mounted within the insert and limits the flow of quenching fluid between the seal and drive shaft in a direction away from the stationary seat. Lip seals mounted at an outboard end of the insert contain the fluid that leaks past the throttle bushing before it is exhausted.

In another embodiment of the invention, the sealing arrangement accommodates an external flush arrangement. In this embodiment, the seal insert supports a mechanical seal in an intermediate position along the drive shaft. In addition, the seal insert includes structure for supporting an intermediate sleeve member that extends from an inner end of the insert and sealingly engages a pump housing insert. Preferably the sleeve member is positioned to surround the seal. In one application, a port is formed in the intermediate seal member in order to provide a flow path for fluid to the seal region. Flushing fluid communicated to the seal region flows out of the region through a check valve control passage that communicates with the pump inlet. In another application, the intermediate sleeve isolates the seal region around the seal. In this application, the intermediate sleeve serves as a jacket. Cooling or heating fluid communicated to the outside of the intermediate sleeve is used to cool or heat the seal region without actually making contact with the seal.

According to another embodiment of the invention, a seal cartridge is disclosed which comprises an assembly including both rotational and non-rotational portions of the seal that is installed into the backhead as a unit. In the preferred construction of this embodiment, the cartridge includes a seal insert member which is adapted to be sealingly received by the backhead and which includes a seal mounting member adapted to be received by the drive shaft and rotates therewith.

In the preferred and illustrated embodiment, the seal cartridge includes a sleeve-like member to which the rotating portions of the seal assembly are fixed. The sleeve is sized to fit over the drive shaft and is clamped to the drive shaft between a shoulder and a bearing race forming part of the drive shaft bearing. As a result, the seal sleeve and associated seal portion are locked to the shaft and rotate therewith. The seal cartridge is easily removed when repair is necessary, by releasing the seal insert and the seal sleeve and removing the assembly as a single unit.

The disclosed seal system allows a wide variety of seal types and seal arrangements to be installed into the backhead of a gear type pump without requiring substantial modifications to either the backhead or the drive shaft. In the case of the cartridge seal embodiment of the present invention, the seal is installed into the backhead as an integral assembly and is easily serviced and replaced. Precise adjustments and specialized installation techniques are wholly eliminated.

Additional features of the invention will become apparent and a fuller understanding obtained by reading the following detailed description made in connection with the accompanying drawings.

BEST MODE FOR CARRYING OUT THE INVENTION

Figure 1:
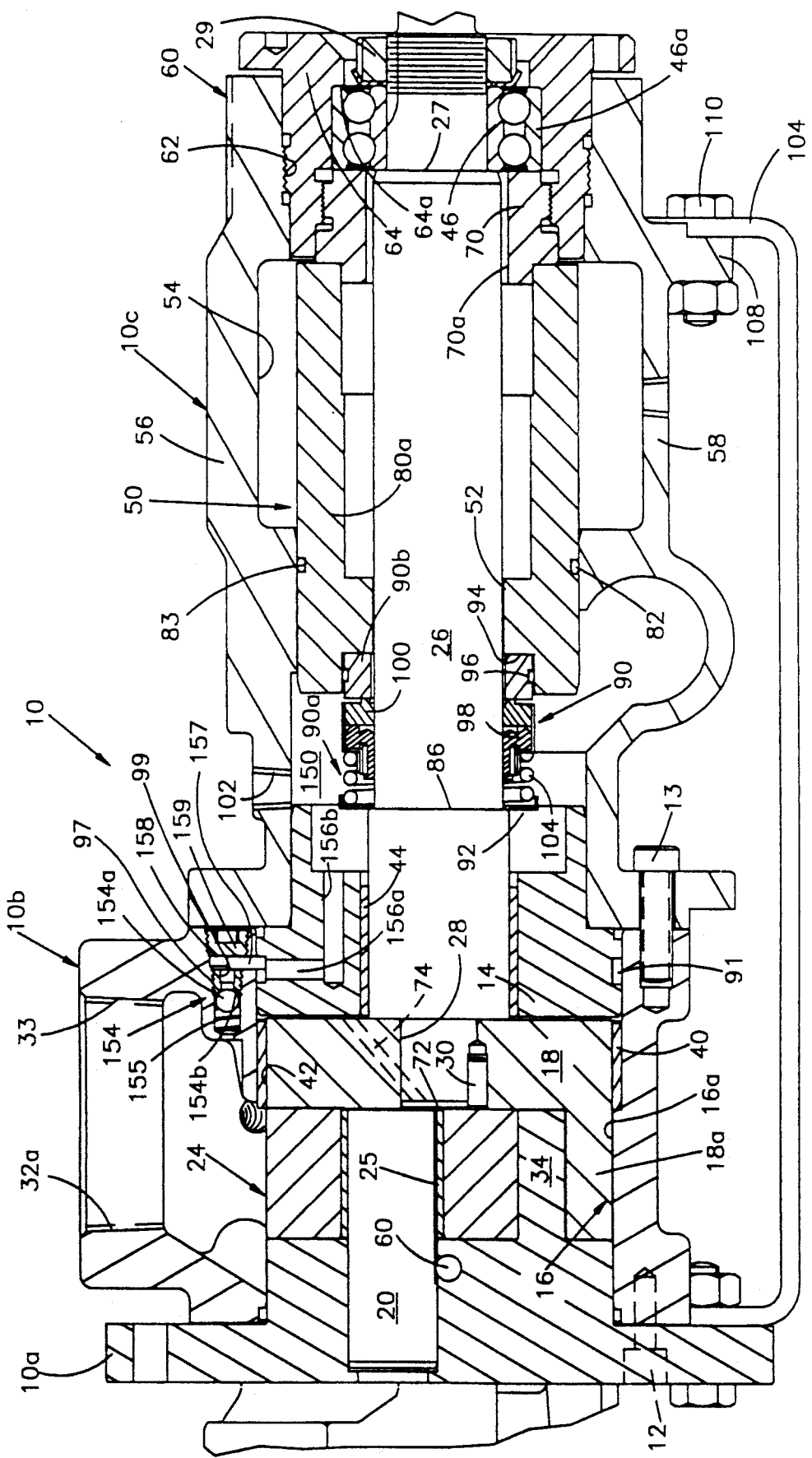
FIG. 1 is a sectional view of a gear within a gear, transfer pump constructed in accordance with the preferred embodiment of the invention.

FIG. 1 illustrates the overall construction of a transfer gear pump embodying the present invention. The gear pump includes a gear casing indicated generally by the reference character 10 which comprises a head 10a, a pump housing 10b and a backhead 10c. The three casing components are bolted together by a plurality of bolts 12, 13. The pump members 10a, 10b and a sleeve-like pump insert 14 together define a pumping chamber 16. A rotor 18 is rotatable within the pumping chamber 16 including a plurality of radially extending teeth 18a. The head 10a mounts a fixed idler pin 20 which rotatably supports an idler gear 24 that is in meshing relationship with the peripheral teeth 18a of the rotor 18. In illustrated embodiment, the idler gear 24 includes a bushing 25.

The rotor 18 is driven by an external drive motor (not shown) through a drive shaft 26. The drive shaft 26 extends through the backhead 10c and is press fitted into a central bore 28 formed in the rotor 18. A set screw 30 is used to lock the rotor 18 to the shaft 28 to inhibit relative rotation between the members.

Figure 2:
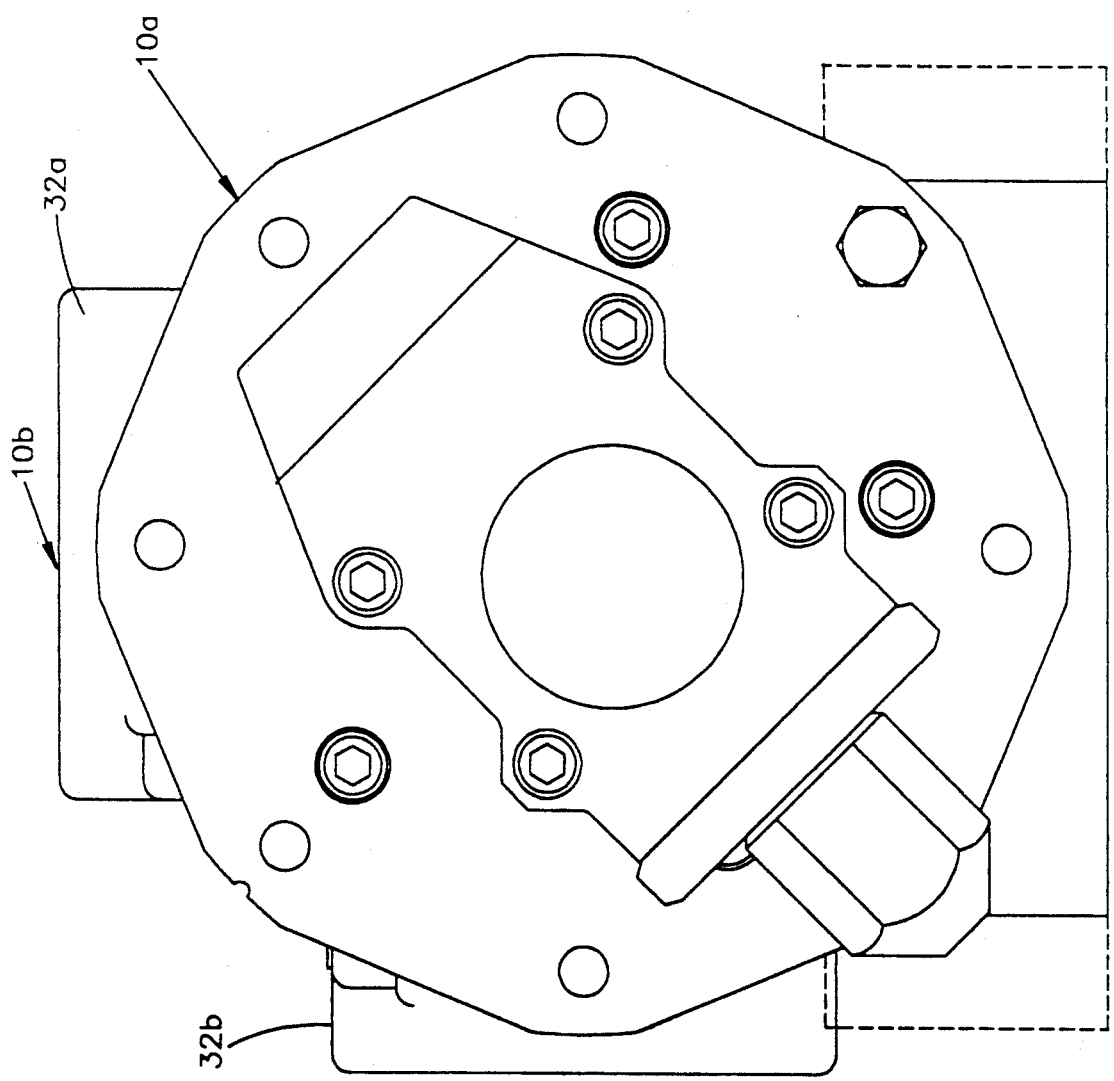
FIG. 2 is a left end view of the pump shown in FIG. 1.

The pump (or rotor) housing 10b defines ports 32a, 32b, only one of which is shown in FIG. 1. The ports 32a, 32b are both shown in FIG. 2. Each port 32a, 32b may include a threaded portion 33 by which connections to conduits, etc. can be made. A crescent 34 is integrally formed in the head 10a and is positioned between a peripheral portion of the idler gear 24 and an inner peripheral region of the outer rotor 18.

Returning to FIG. 1, at least a portion of the periphery of the rotor 18 is rotatably supported by an annular bearing 40 which is pressed fitted into the housing 10b. In the preferred and illustrated embodiment, the annular bearing 40 surrounds and confronts a peripheral surface 42 of the rotor 18. This portion of the rotor is termed a "skirt". The use of the rotor bearing 40 enables the pump to operate at higher pressures as compared to prior art pumps.

The shaft 26 is rotatably supported by a bushing 44 pressed fitted into the sleeve-like housing insert 14. An opposite end of the shaft 26 is supported in a conventional, ball bearing assembly 46.

As seen in FIG. 1, the shaft 26 extends through a seal region defined by the backhead 10c and indicated generally by the reference character 50. In particular, a cylindrical surface 52 is defined by structure machined internally in the backhead. In the preferred embodiment, the backhead also includes a window 54 which in the illustrated embodiment is rectangular in cross section and extends completely through the backhead. Bridging elements 56, 58, integrally cast in the backhead 10c, define the window 54 and interconnect an inner portion of the backhead with an end portion 60. The end portion 60 defines an internally threaded bore 62 which is adapted to threadedly receive a bearing cap 64.

In the preferred and illustrated embodiment, a seal insert support ring 70 is threadedly received by the bearing cap 64. The element 70 clamps an outer race 46a of the bearing 46 between itself and a shoulder 64a formed on the bearing cap 64. In addition, the element 70 defines a cylindrical extension 70a which is adapted to mount seal inserts.

In FIG. 1, the element 70 supports one end of a tubular or sleeve like, seal insert 80a. In the preferred embodiment, the tubular insert 80a is press fitted onto the extension 70a. As a result, the element 70 locates and maintains the position of the insert 80a within the seal region defined by the backhead 10c.

As seen in FIG. 1, the other end of the insert 80a is supported by the internal, cylindrical backhead surface 52. Preferably, a secondary seal seals the interface between the insert 80a and the backhead. In the illustrated embodiment, the secondary seal comprises an O-ring seal 82 positioned within an associated O-ring groove 83 defined by the insert 80a.

The drive shaft 26 defines an abutment surface, which in the preferred and illustrated embodiment is a shoulder 86. When a two-piece seal is installed in the pump, a rotating portion of the seal abuts the shoulder 86.

An example of one type of seal arrangement is illustrated in FIG. 1. In particular, a mechanical seal 90 including a spring biased rotating portion 90a is positioned around the drive shaft 26 and includes a spring seat 92 which abuts the drive shaft shoulder 86. A nonrotating, seal seat 90b is held by the insert 80a in a counter bore 94. An O-ring seal 96 inhibits fluid leakage between the seat 90 and the insert 80a. As is conventional, the rotating portion of the seal includes a bellows 98 clamped to the shaft and a rotating seal ring 100. A spring 104 biases the rotating seal ring 100 towards the seal seat 90b. While we have illustrated a bellows type pusher seal 90 in FIG. 1, those skilled in the art will recognize that other single mechanical seal types can be used in place of the seal type illustrated.

A small, tapped bore 102 is formed in the backhead and is positioned and aligned with the region where the rotating portion of a mechanical seal is mounted. The bore 102 serves primarily as an access port in these applications and enables a user to lock certain types of mechanical seals to the shaft. Other functions for the opening 102 will be explained below.

Figure 3:
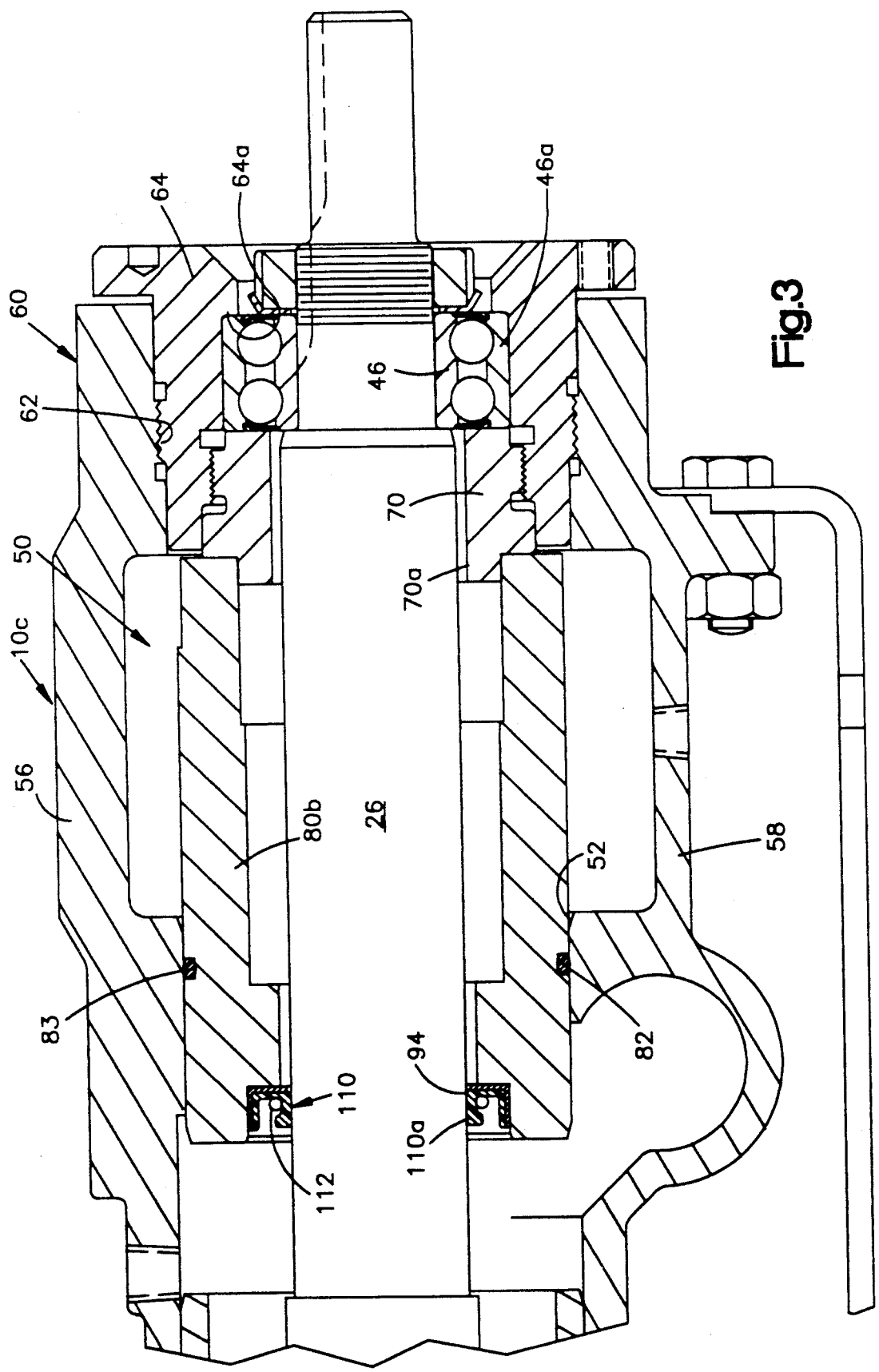
FIG. 3 is a fragmentary, sectional view of the gear within a gear, transfer pump showing another embodiment of a seal arrangement constructed in accordance with the invention.

FIG. 3 illustrates another seal arrangement that utilizes a conventional lip seal 110 to inhibit fluid leakage between the shaft 26 and the backhead 10c. In particular, an insert 80b mounts a conventional lip seal 110 in the counter bore 94. As is conventional, the lip seal 110 includes a spring loaded lip 110a which is urged towards the periphery of the shaft 26 by a spring 112. As should be apparent, the construction of the backhead 10c is the same for both seal applications. The seal insert 80b is virtually identical to the seal insert 80a shown in FIG. 1.

Figure 4:
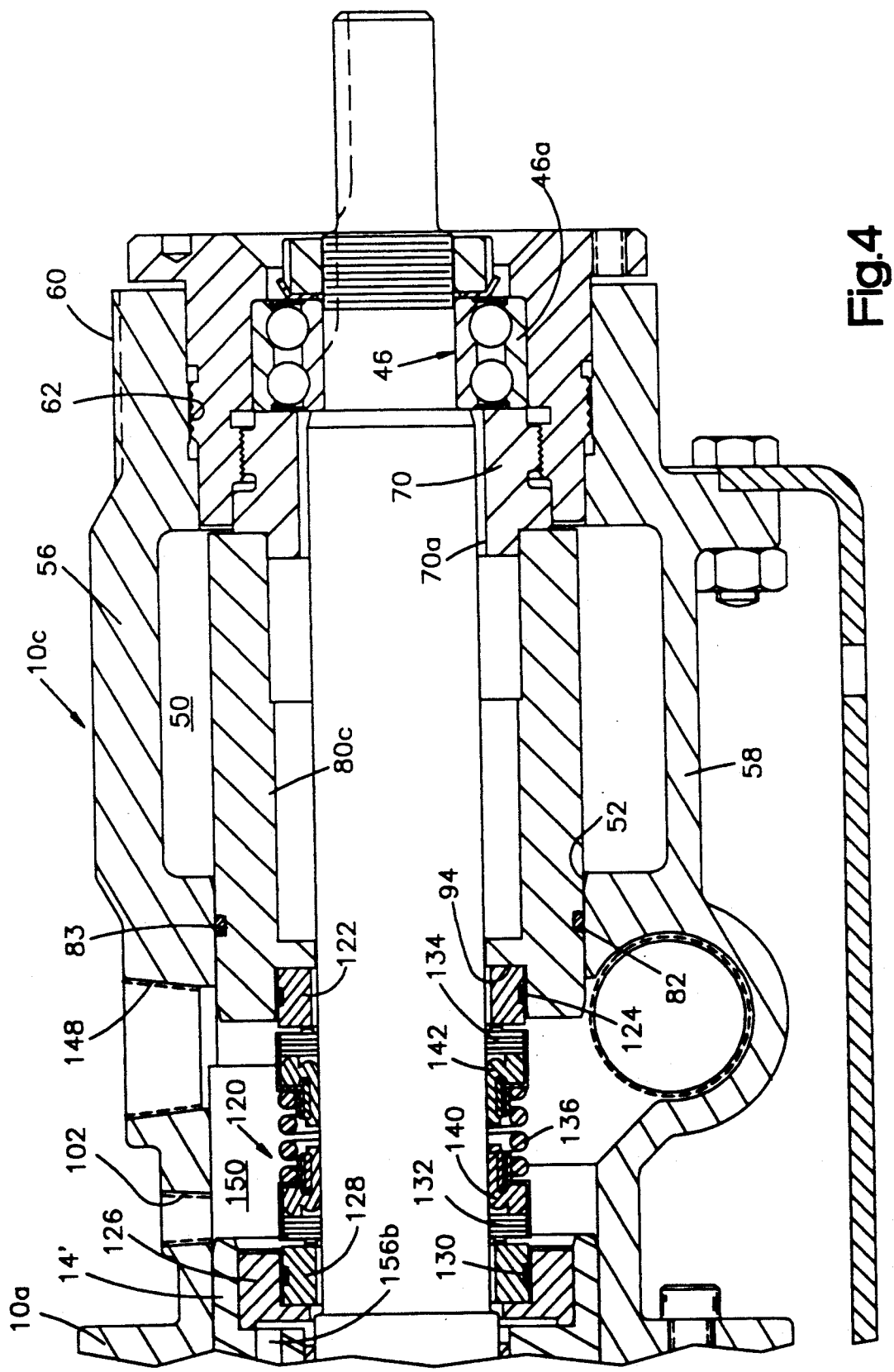
FIG. 4 is a fragmentary, sectional view of the gear within a gear, transfer pump showing another embodiment of a seal arrangement constructed in accordance with the invention.

FIG. 4 illustrates another embodiment of the invention. In this embodiment, a double seal 120 is employed. A seal insert 80c, substantially similar to the seal inserts 80a, 80b shown in FIGS. 1 and 3, mounts a non-rotating seat 122 which is sealed to the insert 80c by an O-ring 124. As seen in FIG. 4, in this seal configuration, a modified pump insert 14' is used. Pump insert 14' includes a mounting collar 126 which sealingly mounts another stationary seat 126. An O-ring 130 seals the interface between the stationary seat 128 and the mounting collar 126.

The double seal 120 includes a pair of rotating seal rings 132, 134 which are urged toward sealing engagement with their associated stationary seats 128, 122 by a biasing spring 136. Bellows elements 140, 142 associated with the seal rings 132, 134, respectively seal against the shaft as a secondary seal.

In this seal configuration, a larger tapped opening 148 is provided in the backhead 10c by which a seal region 150 can be pressurized with fluid. In the preferred method of operation, the region 150 is pressurized to a level above the system inlet pressure. This ensures that any fluids or gases that cross the seal faces 128, 132 flow from the region 150 towards the suction side of the pump. This inhibits even minute amounts of pumped fluid from entering the atmosphere. The connection with the suction side of the pump is achieved through a check valve 154 and associated passages 156a, 156b (shown best in FIG. 1). The operation of the check valve 154 is more fully described in co-pending application, Ser. No. 07/673,948, filed concurrently herewith which is hereby incorporated by reference.

The check valve 154 includes a check ball 154a biased towards a seat 154b by a spring 155. The upper end of the passage 156a communicates with the check valve 154 via an annular groove 91 formed in the insert 14' and a groove 157 formed in the housing 10b. The housing groove 157 aligns with annular grove 91 and adjoins the check valve 154. A multi-stepped bore 158, including tapped portions, is formed in the housing 10b. The stepped bore 158 is adapted to receive a threaded plug 159 which seals the bore after assembly. When engaged in a tapped bore portion 97, the check valve seat 154b provides a seat against which the check valve ball 154a is spring biased by the 155. The check ball 154a allows the flow of fluid from the seal cavity 150 through an orifice 99 while restricting flow in the reverse direction. This check valve arrangement which is used in this seal configuration as well as the other disclosed configurations serves to maintain relatively low seal face loads, which should increase seal life.

Pressurized fluid for communication to the region 150 is supplied from a separate supply of pressurized fluid that is delivered to the port at a pressure higher than the pressure of fluid at the inlet port 32a.

Figure 5:
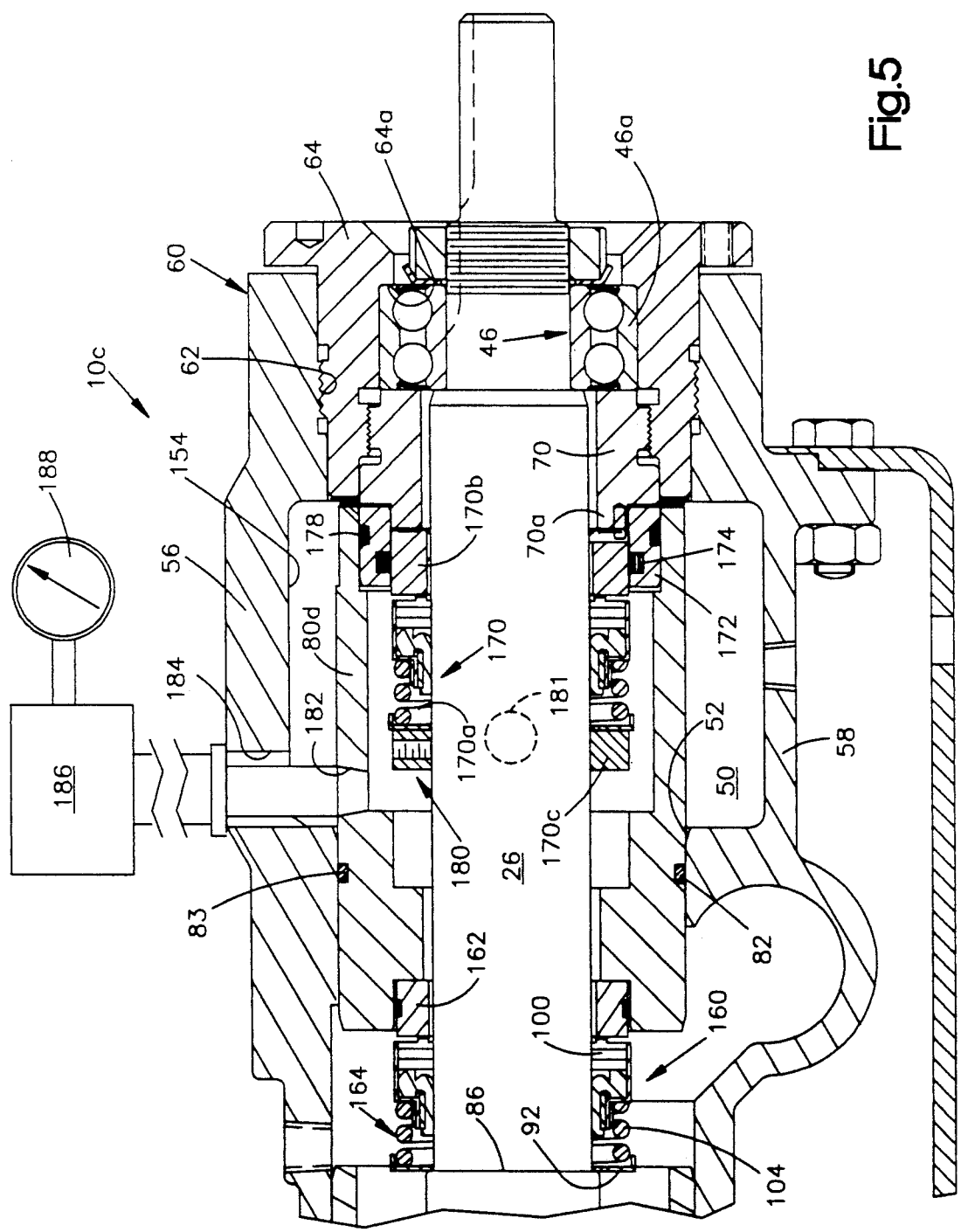
FIG. 5 is a fragmentary, sectional view of the gear within a gear, transfer pump showing another embodiment of a seal arrangement constructed in accordance with the invention.

FIG. 5 illustrates another embodiment of the invention. In this embodiment, tandem seals are employed and in particular, include a mechanical type seal 160 which is substantially similar in location, mounting and operation as the mechanical seal 90 illustrated in FIG. 1. In this embodiment, a seal insert 80d mounts a non-rotating, stationary seat 162 in alignment with a rotating portion 164 of the seal 160 that rotates with the shaft 26. As explained above in connection with FIG. 1, a biasing spring 104 urges a rotating seal ring 100 in sealing engagement with the stationary seat 162. A spring stop 92 abuts the shoulder 86 formed on the shaft 26.

In this embodiment, and as seen in FIG. 5, a second or tandem seal is located outboard of the seal 160. In the illustrated embodiment, the second seal 170 is also a mechanical type seal and includes a rotating portion 170a fixed to the shaft 26 and a non-rotating seat 170b. The seal insert 80d in this embodiment, is supported by a collar 172 which in turn is held to the extension 70a of the insert support ring 70. An O-ring 174 seals the stationary seat 170b to the intermediate collar 172. An O-ring 178 carried by the insert 80d seals the interface between the insert 80d and the intermediate support collar 172.

In the illustrated embodiment, the rotating portion of the seal 170a is held to the shaft 26 by a collar and set screw arrangement 180. Access to the set screw is provided by an access opening 181 formed in the insert 80d. The opening 181 is plugged after the seal is installed.

In order to lubricate the seal 170, the seal insert 80d includes a threaded port 182 which is aligned with a port 184 of larger diameter formed in the backhead 10c, when the insert 80d is placed in its installed position. A source of separate lubrication 186 which may be a pressurized vessel of lubricant is attached to the seal insert 80d by means of a threaded stem 186a which is threaded into the seal insert 80d. A pressure gage 188 provides an indication of the quantity of fluid in the reservoir 186 and apprises the user when a replacement is necessary. It should be noted that the tandem seal illustrated in FIG. 5 is accommodated in the back head 10c with out substantial modification. Only the seal insert 80d is specially configured in order to accommodate the seal arrangement.

Figure 6:
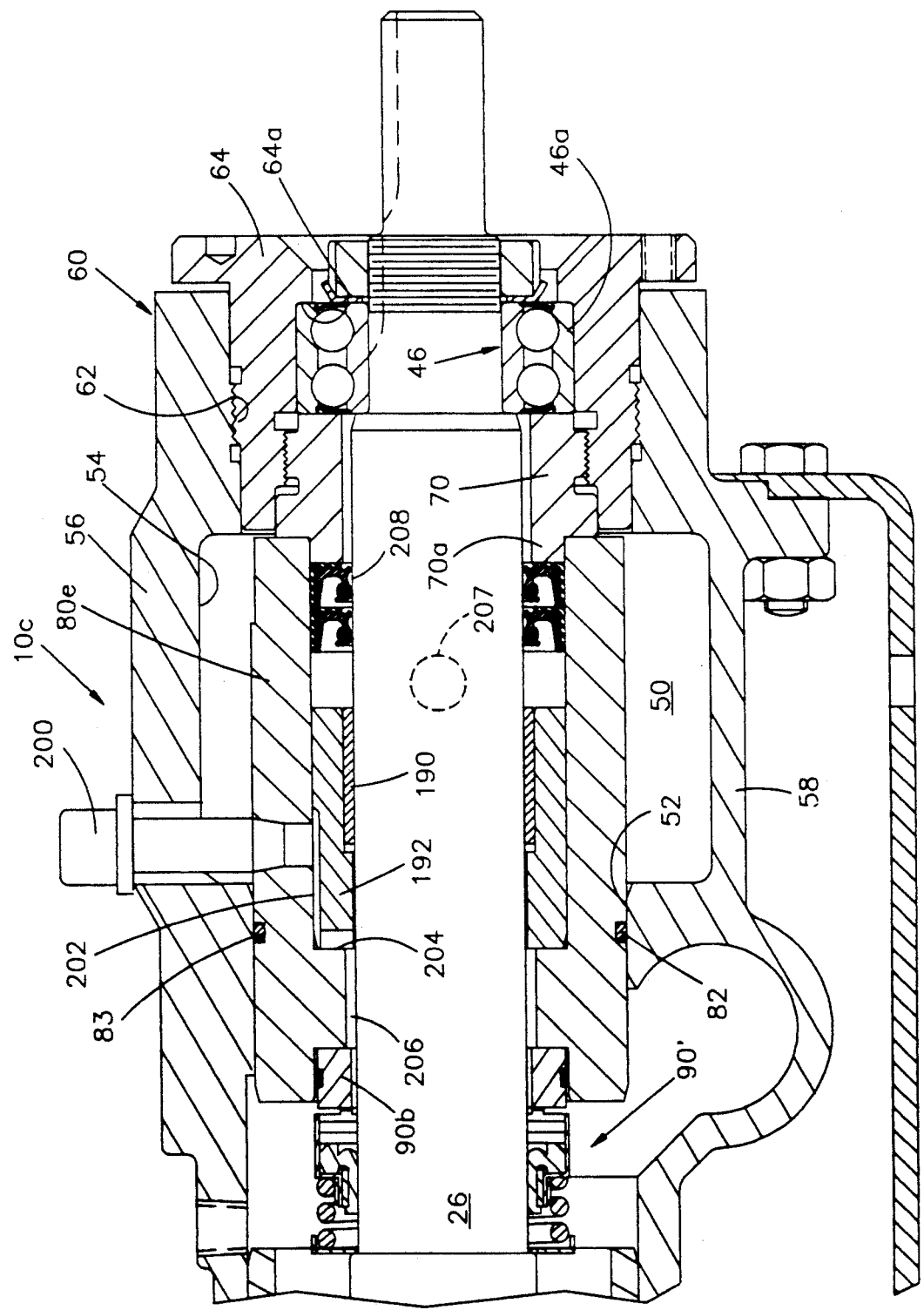
FIG. 6 is a fragmentary, sectional view of the gear within a gear, transfer pump showing another embodiment of a seal arrangement constructed in accordance with the invention.

FIG. 6 illustrates still another seal arrangement that can be accommodated by the present invention. In this embodiment, means for "quenching" a stationary seat of a mechanical type seal is illustrated. In this embodiment, a mechanical seal 90' which may be similar to or identical to the mechanical seal 90 shown in FIG. 1 inhibits fluid leakage between the shaft 26 and backhead 10c in the manner described in connection with FIG. 1. In this embodiment, however, a seal insert 80e is utilized which carries the stationary seat 90b but which also includes a provision for communicating pressurized quenching medium to the stationary seat. In particular, the seal insert 80e is supported between the backhead cylindrical surface 52 and the extension 70a of the seal support ring 70 as described in connection with FIG. 1. In addition, the insert mounts a throttle bushing 190 held by a sleeve 192. Quenching medium is communicated to a fitting 200 and travels to the stationary seat 92b via axial channel 202 formed on the periphery of the sleeve 192, a radial passage 204 formed at the left end of the sleeve (as viewed in FIG. 6) and an annular passage 206 formed in the insert 80e. A pair of lip seals 208 contain fluid that is forced passed the throttle bushing 190. The quenching medium is eventually exhausted through a discharge port 207 formed in the insert 80e. The port 207 may be connected to a suitable discharge or drain conduit.

Figure 7:
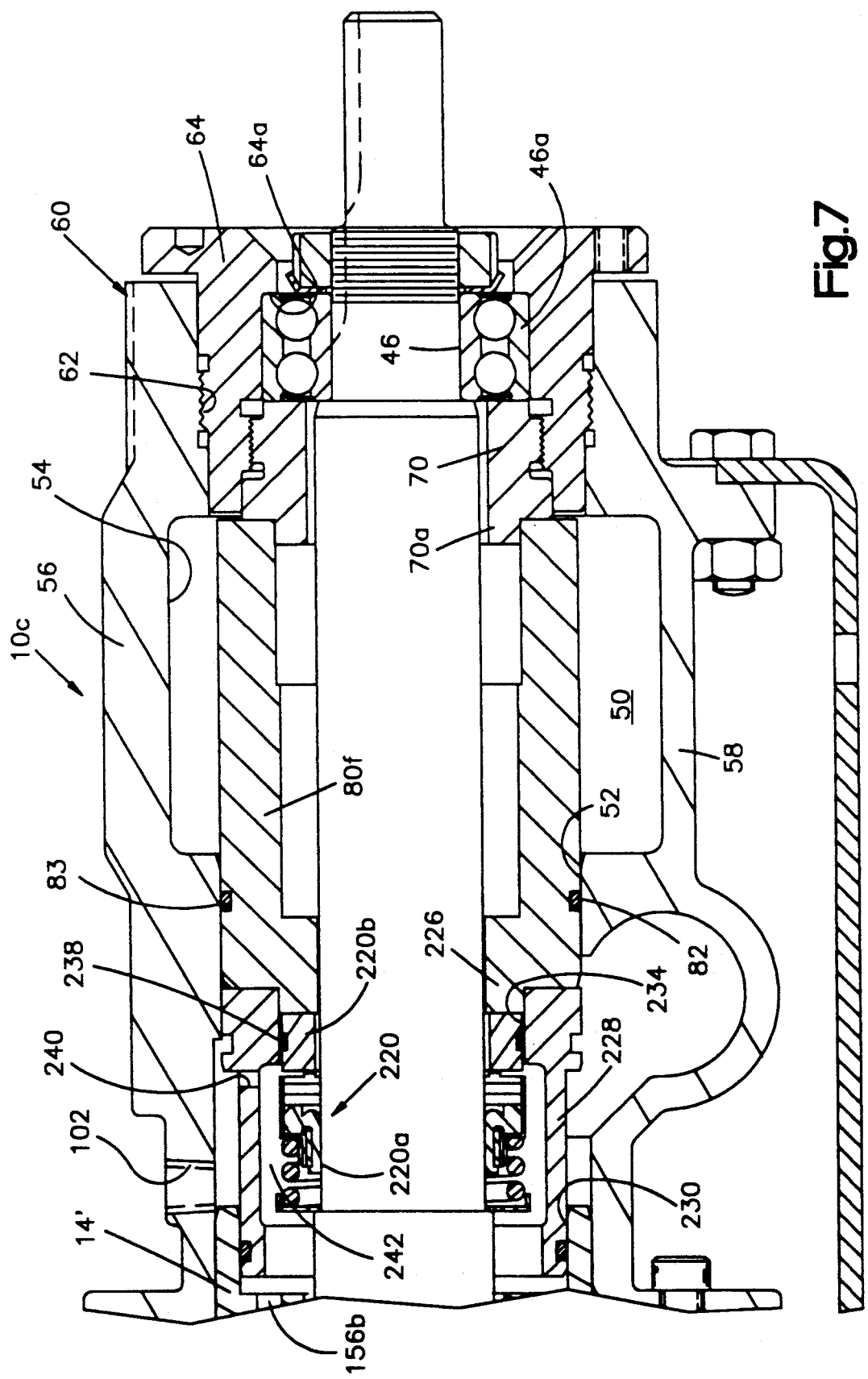
FIG. 7 is a fragmentary, sectional view of the gear within a gear, transfer pump showing another embodiment of a seal arrangement constructed in accordance with the invention; and, FIG. 8 is a fragmentary, sectional view of the gear within a gear, transfer pump showing another embodiment of a seal arrangement constructed in accordance with the invention.

FIG. 7 illustrates an external flush arrangement which can be accommodated by the present invention. In this embodiment, a mechanical seal 220 substantially similar or identical to the seal 90 shown in FIG. 1 is employed and includes a rotating portion 220a and a stationary seat 220b. In this embodiment, a seal insert 80f is held between the cylindrical surface 52 formed in the backhead 10c and the extension 70a of the seal support ring 70. However, the seal insert 80f includes a reduced diameter portion 226 which forms a support for one end of an intermediate sleeve member 228. The intermediate sleeve support member 228 extends from the seal insert 80f and sealingly engages a cylindrical wall surface 230 defined by the pump housing insert 14'. The intermediate sleeve 228 surrounds the mechanical seal 220.

The stationary seat 220b is rigidly supported by an inside bore 234 of the intermediate sleeve. An O-ring seal 238 seals the interface between the stationary seat 220b and the intermediate sleeve 228.

In one application, the intermediate sleeve includes a radial bore 240 formed in the intermediate sleeve. A source of flushing medium (not shown) attached to the tapped opening 102 communicates a flushing medium to a seal region 242 via the bore 240. The flushing medium is discharged from the seal region through the passages 156a, 156b and the check valve 154 into the pump inlet 32a as described above and shown in FIG. 1.

In another application, the small bore 240 is eliminated or plugged and in this configuration the intermediate sleeve forms a jacket around the seal region 242 that is isolated from the tapped opening 102. In this application, a heating or cooling fluid can be circulated around the outside if the intermediate sleeve 228 in order to either heat or cool the seal region 242. In this application, another opening (not shown) is provided in the backhead, preferably 180° away from the opening 102 and acts as a discharge port for the cooling/heating fluid.

Figure 8:
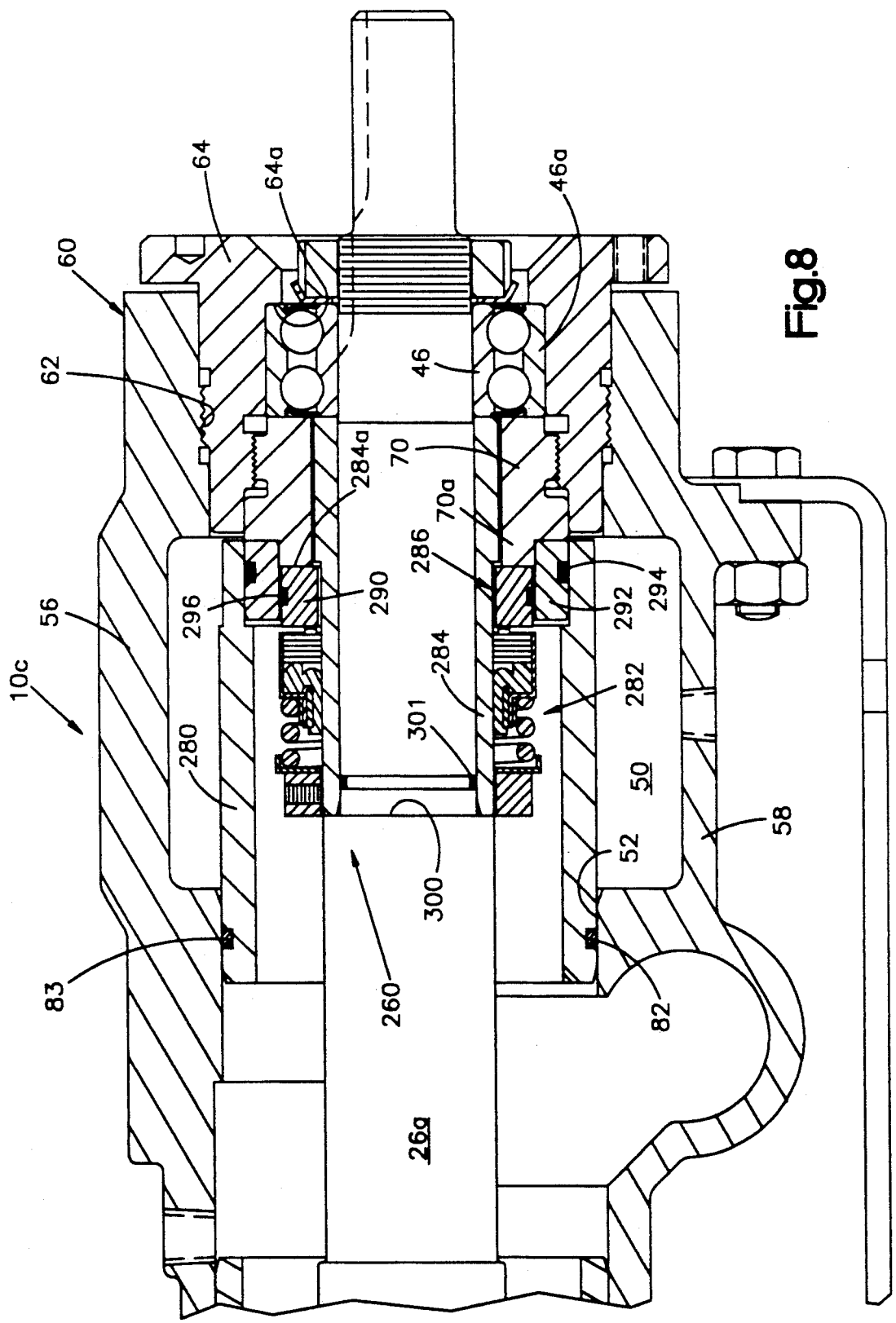

FIG. 8 illustrates another embodiment of the invention. In this embodiment of the invention, the seal arrangement includes a cartridge seal 260 which is installed as a unitary assembly. As seen in FIG. 8, the cartridge seal assembly 260 includes a non-rotating sleeve-like support member or insert 280 which extends between the backhead sealing surface 52 and the support member 70. According to the preferred and illustrated embodiment, the rotating portion of the seal cartridge 260 indicated generally by the reference character 282 are mounted to a shaft sleeve 284. A non-rotating portion of the seal 260 indicated generally by the reference character 286 is supported by the seal insert 280. In the illustrated embodiment, a non-rotating seat 290 is held in a predetermined radial position with respect to the insert 280 by an intermediate support collar 292. O-ring seals 294, 296 inhibit fluid leakage between the members.

According to the invention, the shaft sleeve 284 (which mounts the rotating portion 282 of the seal 260), intermediate ring 292 and seal seat 290 are preassembled. As seen in FIG. 8, the sleeve 284 includes a stepped portion 284a. The rotating portion 282 of the seal 260, as seen in FIG. 8, is held in its initial position by a collar 285 including set screw 285a which provides an abutment for the spring seat 92. The stepped portion 284a of the sleeve serves as an abutment for the stationary seat 290, during the initial assembly process. The collar 285 can be used to adjust the initial preload on the seal face.

The assembled rotating portion 282 of the seal 260 is then mounted to the seal support member 280 prior to final assembly. To install the assembly into the backhead 10c, the seal assembly 260 is mounted to the bearing cap 64 by a press fit over extension 70a. As the extension 70a is pressed into position, an end face 70b of the extension 70a contacts the stationary seat 290 and moves is axially along the sleeve 284 to move it out of contact with the step 284a so that a slight gap is developed between the stationary seat 290 (which does not rotate) and the step 284a of the rotating sleeve 284.

The shaft sleeve 284 is inserted over the shaft 26a and the entire assembly is then threaded into the end of the backhead. The shaft sleeve 284 is pushed into the housing until the left end (as viewed in FIG. 8) of the shaft sleeve 284 abuts a shoulder 300 formed in the drive shaft 26. The rotating sleeve 284 is thus clamped between the shoulder 300 and the inner bearing race 46a and thus rotates with the shaft 26a. A secondary seal is formed between the shaft 26a and the sleeve 284 by an O-ring 301.

It is to be understood that various types of seals other than the mechanical type seal shown in FIG. 8 can be adapted to this cartridge configuration.

As should be apparent, the seal assembly illustrated in FIG. 8 can be easily installed into the backhead 10c and eliminates the need of installing individual components of the seal onto the shaft or into the housing and eliminates the need for precisely locating the components and/or precisely adjusting their relative positions.

It should be apparent, that the disclosed construction enables a gear pump having an axially extending shaft to accommodate a wide arrangement of seals without requiring substantial modification to either the backhead 10c or the shaft 26. In addition, the disclosed invention provides a seal cartridge type of seal which is easily replaced or serviced. Moreover, a wide variety of cartridge type seals can also be accommodated without substantial modification to either the backhead or drive shaft.

With many of the disclosed seal configurations, such as the configurations shown in FIGS. 1 and 4, a substantial clearance is provided around the periphery of the rotating portion of the seal. In the preferred embodiment, this clearance is substantially greater than the minimum clearance required by manufacturer of the disclosed seal. These rather large clearances provided by the disclosed invention, reduce viscous drag and reduce heat generation.

Another advantage of the disclosed invention is that once the seal is installed, the rotating and nonrotating portions of the seal move together when adjustments are made to the rotor position. Referring to FIG. 1, the outer race 46a of the rotor bearing 46 is held between the insert support ring 70 and the shoulder 64a of the bearing cap 64. In the preferred embodiment, the insert support 70 is locked to the bearing cap 64 during assembly so that the support 70 and bearing cap 64 move as a unitary component.

The inner race of the bearing 46 is held between a shoulder 27 formed in the rotor shaft 26 and a mounting nut 29. As should be apparent, once the pump is assembled, rotation of the bearing cap 64 effects overall axial movement in the rotor shaft 26 since the bearing 46 is locked to the shaft 26 and to the bearing cap 64.

According to this feature of the invention, since the insert 80a is held by the extension 70a of the support element 70 and the rotating portion 90a of the seal 90 is held by the shaft 26, whenever rotor shaft position adjustments are made by the bearing cap 64, the rotating and non-rotating seal portions move together. As a result, the seal-to-seat loading does not change when axial adjustments are made to the rotor shaft 26. It should be noted that adjustments to the rotor shaft position are normally made throughout the life of the pump due to wear and other factors. With the disclosed invention, these adjustments do not substantially affect the loading of the seal.

Although the invention has been described with a certain degree of particularity, it should be understood that those skilled in the art can make various changes to it without departing from the spirit or scope of the invention as hereinafter claimed.

We claim:
1. A fluid transfer pump, comprising:
a) a pair of gears positioned in meshing relationship within a pump chamber defined by a housing;
b) a drive shaft extending axially from one of said gears adapted to be connected to a pump drive means;
c) a backhead surrounding at least a portion of said drive shaft;
d) sealing apparatus including seal means for inhibiting fluid leakage between said drive shaft and said backhead, said sealing apparatus comprising:
 i) a removable sleeve-like insert positioned within said backhead and around a portion of said drive shaft;
 ii) an insert support member removably engaged with an end portion of said backhead including end engaging means for supporting one end of said insert in coaxial alignment with said drive shaft; and,
 iii) insert engagement structure defined by said backhead engaging said insert at a location spaced from said one end and including means for providing sealing engagement between said structure and said insert, said insert engagement structure supporting another end of said insert in coaxial alignment with said drive shaft;
 iv) seal mounting means forming part of said insert operative to mount at least a portion of said seal means in sealing alignment with said drive shaft.

2. The apparatus of claim 1 wherein said insert support member comprises a threaded ring-like element threadedly received in an end bore defined by said backhead and including extension means positioned to engage said one end of said insert.

3. The apparatus of claim 2 wherein said one end of said insert is press fitted to said extension means.

4. The apparatus of claim 1 further comprising an abutment means defined by said shaft against which a rotating portion of said seal means abuts.

5. The apparatus of claim 1 wherein said seal mounting means defined by said seal insert comprises a counterbore at an inner end of said insert.

6. The apparatus of claim 1 wherein said seal means comprises a lip seal held in said seal mounting means in said insert and positioned such that said lip seal is in sealing engagement with an outer surface of said drive shaft.

7. The apparatus of claim 1 wherein said seal apparatus comprises a cartridge seal including:

i) a seal support sleeve sized to fit around said drive shaft;
   ii) an assembly interconnecting means for interconnecting said insert with said seal support sleeve to form an assembly that is installed as a unit into said backhead through said end bore; and,
   iii) clamping means for clamping said seal support sleeve to said shaft to inhibit relative rotation therebetween.

8. The apparatus of claim 7 wherein said clamping means comprises an abutment defined by said drive shaft against which one end of said sleeve abuts and a bearing means against which another end of said sleeve abuts and further comprising means for exerting clamping forces on said sleeve in order to capture said sleeve between said shaft abutment and said bearing means.

9. The apparatus of claim 8 wherein said bearing means comprises an inner race of a drive shaft support bearing.

10. The apparatus of claim 1 wherein said sealing apparatus comprises a rotating portion fixed to said shaft and a non-rotating portion held by said insert.

11. The apparatus of claim 1 wherein said seal means comprises a mechanical seal including a rotating seal member fixed to and rotatable with said drive shaft and a seat held by said insert and sealingly engaged by said rotating seal member.

12. The apparatus of claim 1 wherein said seal means comprises a double seal said double seal comprising:
   i) a first stationary seat held in said seal mounting means of said insert, a second stationary seat held in structure defined by a pump insert located inwardly with respect to said seal insert;
   ii) a pair of seal rings sealingly clamped to said drive shaft and rotatable therewith; and
   iii) biasing means for urging said seal rings towards their associated stationary seats.

13. The apparatus of claim 11 further comprising:
   i) a second seal located outboard of said mechanical seal, said outboard seal surrounded by said seal insert; and
   ii) lubricating means including means for communicating a lubricating fluid to a region around said outboard seal from an external source.

14. The apparatus of claim 13 wherein said means for communicating lubricating fluid includes a port defined in said seal insert that is aligned with an access opening defined by said backhead when said seal insert is in its installed position.

15. The apparatus of claim 11 further including an access opening defined by said backhead through which access to at least a portion of said mechanical seal is provided.

16. The apparatus of claim 1 wherein said seal mounting means rigidly supports a stationary seat sealingly engaged by a rotating seal portion mounted to said shaft and further includes quenching means for communicating quenching fluid to said stationary seat.

17. The apparatus of claim 16 wherein said quenching means includes:
   i) means for communicating quenching fluid to an internal region defined by said seal insert;
   ii) passage means for communicating quenching medium from said interior region to said stationary seat;
   iii) means for restricting the flow of quenching fluid in a direction away from said stationary seat; and,
   iv) means for exhausting the quenching fluid from said internal region.

18. The apparatus of claim 17 wherein said means for restricting flow comprises a throttle bushing surrounding said shaft and held by said seal insert and further comprises lip seals mounted at an outboard end of said seal insert.

19. The apparatus of claim 1 further comprising:
   i) an intermediate sleeve member held at one end by said seal insert and extending into sealing contact with a pump housing insert spaced inwardly from said seal insert;
   ii) said sleeve member surrounding a seal region; and,
   iii) a stationary seat at least partially located by said seal insert and a rotating seal portion secured and rotatable with said drive shaft, at least a part of said rotating seal portion located within said seal region.

20. The apparatus of claim 19 further including means for communicating flushing fluid to said seal region defined by said intermediate sleeve member including means for discharging said flushing fluid to an inlet of said pump.

21. The apparatus of claim 19 wherein said sleeve member defines a jacket for isolating said seal region and further includes means for providing heating/cooling fluid to a region at least partially defined by an external surface of said intermediate sleeve member such that said heating/cooling fluid heats or cools said seal region without making contact with said seal.

22. A fluid transfer pump, comprising:
   a) a pair of gears positioned in meshing relationship within a pump chamber defined by a housing;
   b) a drive shaft extending axially from one of said gears adapted to be connected to a pump drive means;
   c) a backhead surrounding at least a portion of said drive shaft;
   d) sealing apparatus including seal means for inhibiting fluid leakage between said drive shaft and said backhead, said sealing apparatus comprising:
      i) a removable sleeve-like insert positioned within said backhead and around a portion of said drive shaft;
      ii) an insert support member removably engaged with an end portion of said backhead including means for supporting one end of said insert;
      iii) structure defined by said backhead for supporting another portion of said insert spaced from said one end and including means for providing sealing engagement between said structure and said other insert portion; and,
      iv) seal mounting means forming part of said insert operative to mount at least a portion of said seal means in sealing alignment with said drive shaft; and,
      v) said insert support member comprising a threaded ring-like element threadedly received in an end bore defined by said backhead and including extension means positioned to engage said one end of said insert.

23. A fluid transfer pump, comprising:
   a) a pair of gears positioned in meshing relationship within a pump chamber defined by a housing;
   b) a drive shaft extending axially from one of said gears adapted to be connected to a pump drive means;

c) a backhead surrounding at least a portion of said drive shaft;
d) sealing apparatus including seal means for inhibiting fluid leakage between said drive shaft and said backhead, said sealing apparatus comprising:
   i) a removable sleeve-like insert positioned within said backhead and around a portion of said drive shaft;
   ii) an insert support member removably engaged with an end portion of said backhead including means for supporting one end of said insert;
   iii) structure defined by said backhead for supporting another portion of said insert spaced from said one end and including means for providing sealing engagement between said structure and said other insert portion;
   iv) seal mounting means forming part of said insert operative to mount at least a portion of said seal means in sealing alignment with said drive shaft; and,
e) abutment means defined by said shaft against which a rotating portion of said seal means abuts.

24. A fluid transfer pump, comprising:
a) a pair of gears positioned in meshing relationship within a pump chamber defined by a housing;
b) a drive shaft extending axially from one of said gears adapted to be connected to a pump drive means;
c) a backhead surrounding at least a portion of said drive shaft;
d) sealing apparatus including seal means for inhibiting fluid leakage between said drive shaft and said backhead, said sealing apparatus comprising:
   i) a removable sleeve-like insert positioned within said backhead and around a portion of said drive shaft;
   ii) an insert support member removably engaged with an end portion of said backhead including means for supporting one end of said insert;
   iii) structure defined by said backhead for supporting another portion of said insert spaced from said one end and including means for providing sealing engagement between said structure and said other insert portion; and,
   iv) seal mounting means forming part of said insert operative to mount at least a portion of said seal means in sealing alignment with said drive shaft, said seal mounting means defined by said seal insert comprising a counterbore at an inner end of said insert.

25. A fluid transfer pump, comprising:
a) a pair of gears positioned in meshing relationship within a pump chamber defined by a housing;
b) a drive shaft extending axially from one of said gears adapted to be connected to a pump drive means;
c) a backhead surrounding at least a portion of said drive shaft;
d) sealing apparatus including seal means for inhibiting fluid leakage between said drive shaft and said backhead, said sealing apparatus comprising:
   i) a removable sleeve-like insert positioned within said backhead and around a portion of said drive shaft;
   ii) an insert support member removably engaged with an end portion of said backhead including means for supporting one end of said insert;
   iii) structure defined by said backhead for supporting another portion of said insert spaced from said one en and including means for providing sealing engagement between said structure and said other insert portion;
   iv) seal mounting means forming part of said insert operative to mount at least a portion of said seal means in sealing alignment with said drive shaft; and,
   v) said seal means including a rotating portion fixed to said shaft and a non-rotating portion held by said insert.

26. A fluid transfer pump, comprising:
a) a pair of gears positioned in meshing relationship within a pump chamber defined by a housing;
b) a drive shaft extending axially from one of said gears adapted to be connected to a pump drive means;
c) a backhead surrounding at least a portion of said drive shaft;
d) sealing apparatus including seal means for inhibiting fluid leakage between said drive shaft and said backhead, said sealing apparatus comprising:
   i) a removable sleeve-like insert positioned within said backhead and around a portion of said drive shaft;
   ii) an insert support member removably engaged with an end portion of said backhead including means for supporting one end of said insert;
   iii) structure defined by said backhead for supporting another portion of said insert spaced from said one end and including means for providing sealing engagement between said structure and said other insert portion;
   iv) seal mounting means forming part of said insert operative to mount at least a portion of said seal means in sealing alignment with said drive shaft; and,
   v) said seal means comprising a mechanical seal including a rotating seal member fixed to and rotatable with said drive shaft and a seat held by said insert and sealingly engaged by said rotating seal member.

* * * * *